(12) United States Patent
Poorter et al.

(10) Patent No.: US 8,956,033 B2
(45) Date of Patent: Feb. 17, 2015

(54) DISPLAY DEVICE AND BACKLIGHT MODULE

(75) Inventors: Adjo Poorter, Miao-Li County (TW); Jozef Martha Johanna Notermans, Miao-Li County (TW)

(73) Assignees: Innolux Corporation, Miao-Li County (TW); Innocom Technology (Shenzhen) Co., Ltd., Longhua Town, Shenzhen (CN)

( * ) Notice: Subject to any disclaimer, the term of this patent is extended or adjusted under 35 U.S.C. 154(b) by 148 days.

(21) Appl. No.: 13/456,917

(22) Filed: Apr. 26, 2012

(65) Prior Publication Data

US 2013/0286677 A1 Oct. 31, 2013

(51) Int. Cl.
F21V 7/04 (2006.01)

(52) U.S. Cl.
USPC .............................. 362/602; 362/627; 362/633

(58) Field of Classification Search
USPC ........ 349/58, 61, 65; 362/602, 606, 609, 617, 362/618, 627, 632, 633
See application file for complete search history.

(56) References Cited

U.S. PATENT DOCUMENTS

| | | | |
|---|---|---|---|
| 6,979,113 B2 * | 12/2005 | Nakano | 362/633 |
| 7,093,971 B2 * | 8/2006 | Yu et al. | 362/633 |
| 7,113,235 B2 * | 9/2006 | Tsukamoto | 349/58 |
| 7,367,707 B2 | 5/2008 | Peng et al. | |
| 7,589,803 B2 * | 9/2009 | Huo et al. | 349/65 |
| 8,199,276 B2 * | 6/2012 | Lee et al. | 349/58 |
| 8,223,291 B2 * | 7/2012 | Kim | 349/58 |
| 8,284,349 B2 * | 10/2012 | Kim et al. | 349/65 |
| 8,373,817 B2 * | 2/2013 | Arihara | 349/58 |
| 8,475,032 B2 * | 7/2013 | Masuji | 362/613 |
| 2004/0130885 A1 * | 7/2004 | Nakano | 362/31 |
| 2004/0223313 A1 * | 11/2004 | Yu et al. | 362/31 |
| 2007/0091222 A1 * | 4/2007 | Huo et al. | 349/58 |
| 2007/0273806 A1 * | 11/2007 | Lin et al. | 349/58 |
| 2008/0043413 A1 * | 2/2008 | Okuda | 361/681 |
| 2008/0180972 A1 * | 7/2008 | Sakamoto et al. | 362/613 |
| 2008/0297688 A1 * | 12/2008 | Cheng | 349/58 |
| 2008/0297695 A1 * | 12/2008 | Sekiguchi et al. | 349/65 |
| 2009/0180050 A1 * | 7/2009 | Lee et al. | 349/58 |
| 2009/0262554 A1 * | 10/2009 | Lee et al. | 362/633 |
| 2010/0289979 A1 * | 11/2010 | Lee | 349/58 |
| 2011/0007236 A1 * | 1/2011 | Kim et al. | 349/58 |
| 2011/0128463 A1 * | 6/2011 | Ji et al. | 349/58 |
| 2012/0028424 A1 * | 2/2012 | Shimizu | 438/257 |
| 2012/0140521 A1 * | 6/2012 | Kao et al. | 362/623 |
| 2012/0182763 A1 * | 7/2012 | Masuji | 362/612 |
| 2012/0250290 A1 * | 10/2012 | Park et al. | 362/97.1 |

* cited by examiner

*Primary Examiner* — John A Ward
(74) *Attorney, Agent, or Firm* — McClure, Qualey & Rodack, LLP

(57) ABSTRACT

A display device and a backlight module thereof are provided. The display device comprises a backlight module and a panel. The backlight module includes a bottom frame, a light guide, an optical film structure and a top frame. The light guide is disposed above the bottom frame. The optical film structure is disposed above the light guide. The top frame covers a periphery of the optical film structure and covers a lateral side of the bottom frame. The panel is disposed above the top frame.

15 Claims, 2 Drawing Sheets

DISPLAY DEVICE AND BACKLIGHT MODULE

BACKGROUND OF THE INVENTION

1. Field of the Invention

The invention relates in general to a display device and a backlight module thereof, and more particularly to a display device having a border and a backlight module thereof.

2. Description of the Related Art

With the development of display technology, varied display devices are invented and widely used in electric devices. In a display device, a backlight module is used for providing a light. The light passes through a panel and then an image is shown. A frame is used for assembling the backlight module and the panel.

For assembling the backlight module and the panel, a plastic casing might be used for carrying the backlight module and a double sided adhesive film might be used for adhering the backlight module and the panel. However, the plastic casing and the double sided adhesive film might form a border. The border will block a view path, such that the visibility of optical artifacts like a bight line or assembly features next to the display active area is prevented when looking at the display under an angle from perpendicular. According to the actual state, the border has been a bottleneck of the development of the display device. It is needed to make a breakthrough on this technology.

SUMMARY OF THE INVENTION

The invention is directed to a display device and a backlight module thereof. A top frame is used in a display device and a backlight module thereof for hiding a periphery of an optical film structure, such that a border of a display device can be narrowed.

According to a first aspect of the present invention, a display device comprises a backlight module and a panel. The backlight module includes a bottom frame, a light guide, an optical film structure and a top frame. The light guide is disposed above the bottom frame. The optical film structure is disposed above the light guide. The top frame covers a periphery of the optical film structure and covers a lateral side of the bottom frame. The panel is disposed above the top frame.

According to a second aspect of the present invention, a backlight module comprises a bottom frame, a light guide, an optical film structure and a top frame. The light guide is disposed above the bottom frame. The optical film structure is disposed above the light guide. The top frame covers a periphery of the optical film structure and covers a lateral side of the bottom frame.

The invention will become apparent from the following detailed description of the preferred but non-limiting embodiments. The following description is made with reference to the accompanying drawings.

DETAILED DESCRIPTION OF THE INVENTION

Preferred embodiments are disclosed below for elaborating the invention. A top frame is used in a display device and a backlight module thereof for hiding a periphery of an optical film structure, such that a border of a display device can be narrowed. However, the following embodiments are for the purpose of elaboration only, not for limiting the scope of protection of the invention. Besides, secondary elements are omitted in the following embodiments to highlight the technical features of the invention.

Figure 1:
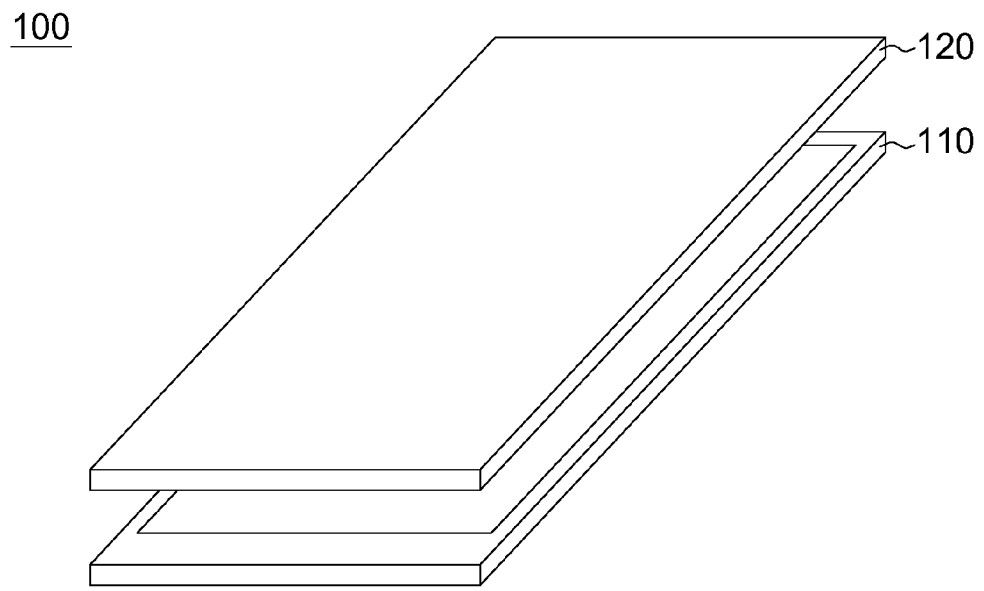
FIG. 1 shows a display device of an embodiment.

Referring to FIG. 1, a display device 100 of an embodiment is shown. The display device 100 includes a backlight module 110 and a panel 120. The backlight module 110 is used for providing a light and can be a cold-cathode fluorescent lamp (CCFL) module or a Light-Emitting Diode (LED) module for example. The light passes through the panel 120 to form an image. The panel 120 can be a liquid crystal display (LCD) panel.

Figure 2:
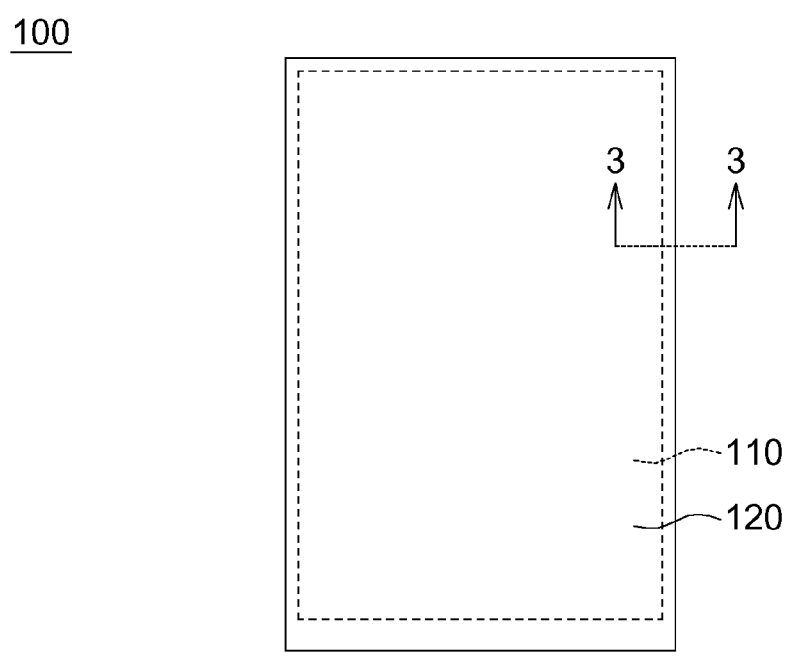
FIG. 2 shows a top view of the backlight module of FIG. 1.
Figure 3:
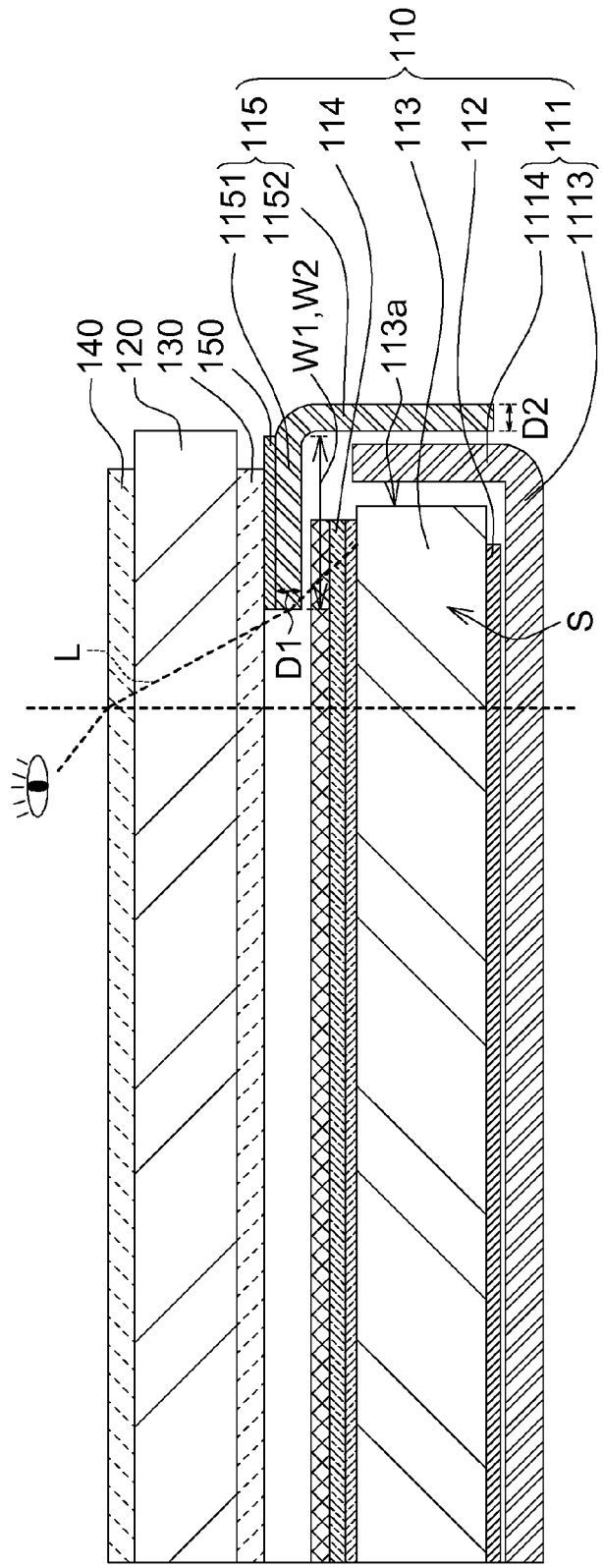
FIG. 3 shows a cross-sectional view along the cross-sectional line 3-3 of the display device of FIG. 2.

Please referring to FIGS. 2 and 3, FIG. 2 shows a top view of the display device 100 of FIG. 1, and FIG. 3 shows a cross-sectional view along the cross-sectional line 3-3 of the display device 100 of FIG. 2. The backlight module 110 includes a bottom frame 111, a reflector film 112, a light guide 113, an optical film structure 114 and a top frame 115. The reflector film 112 is disposed on the bottom frame 111, the light guide 113 is disposed on the reflector film 112, and the optical film structure 114 is disposed on the light guide 113. The light guide 113 is used for guiding a light emitting from a light source. The reflector film 112 is used for reflecting the light to emit upward. The optical film structure 114 is used for scattering or uniforming the light emitting from the light guide.

The bottom frame 111 is used for carrying the reflector film 112, the light guide 113 and the optical film structure 114. The material of the bottom frame 111 can be metal or plastic, such as Cu, Al, steel, stainless steel or Magnesium. The top frame 115 is used for covering the periphery of the optical film structure 114. The material of the top frame 115 can be metal or plastic, such as Cu or Al. The top frame 115 and the bottom frame 111 form a receiving space S, the reflector film 112, the light guide 113 and the optical film structure 114 are disposed inside the receiving space S, and the panel 120 is disposed outside the receiving space S.

In one embodiment, the top frame 115 and the bottom frame 111 can be connected by a locking structure, such as a hook or a clip or welding (for instance laserwelding). The reflector film 112, the light guide 113 and the optical film structure 114 can be firmly fixed inside the receiving space S.

Furthermore, the reflector film 112, the light guide 113 and the optical film structure 114 can be easily assembled via the bottom frame 111 and the top frame 115 without any tape, clicks or screws. The manufacturing speed and the material cost can be greatly reduced.

In the present embodiment, the top frame 115 includes a first board 1151 and a second board 1152. A thickness D1 of the first board 1151 is substantially equal to a thickness D2 of the second board 1152. The first board 1151 and the second board 1152 are formed by bending or deepdrawing a flat board. The first board 1151 and the second board 1152 are substantially perpendicular to each other. In one cross-sectional view, the top frame 150 is a L shaped structure.

The first board 1151 is disposed between the optical film structure 114 and the panel 120. The second board 1152 is connected to the first board 1151 and covers a lateral surface 113a of the light guide 113. For avoiding any leakage light, the first board 1151 is disposed in a gap formed between the optical film structure 114 and the panel 120, and covers the periphery of the optical film structure 114. As shown in FIG. 3, the leakage light is occurred at outside of a view path L (right side of the view path L shown in FIG. 3). Therefore, part of the optical film structure 114 which is located outside of the view path L should be hidden by the first board 1151. The first board 1151 provides enough area for hiding the outside of the view path, therefore the first board 1151 is not needed to extend inwardly.

Further, the bottom frame 111 includes a third board 1113 and a fourth board 1114. The third board 1113 and the fourth board 1114 are substantially perpendicular to each other. The third board 1113 is used for carrying the light guide 113. The fourth board 1114 is connected to the third board 1113 and covers the lateral surface 113a of the light guide 113. The fourth board 1114 is disposed between the lateral surface 113a of the light guide 113 and the second board 1152. There is no need to insert any plastic casing between the fourth board 1114 and the lateral surface 113a of the light guide 113. The light guide 113 is held by the bottom frame 111 without any plastic casing.

Please referring to FIG. 3, the display device 100 further comprises a first polarizer film 130, a second polarizer film 140 and a double sided adhesive film 150. The first polarizer film 130 and the second polarizer film 140 are disposed at two side of the panel 120. The first polarizer film 130 and the second polarizer film 140 are used for changing the polarization of the light and for adjusting the amount of the light passing through the panel 120. The double sided adhesive film 150 is disposed on the first board 1151 for adhering the second polarizer film 130 to the first board 1151. A width W1 of the double sided adhesive film 150 is substantially equal to a width W2 of the first board 1151 or larger than a width W2 of the first board 1151. The first board 1151 provides enough area for adhering the second polarizer film 150, therefore the double sided adhesive film 150 is not needed to extend inwardly such that the first board is not visibility under viewing angle of viewing area L. In this invention, the double sided adhesive film 150 could be a double side tape or a glue layer.

In the display device 100, the first board 1151 and the double sided adhesive film 150 form a border. Because the width W2 of the first board 1151 can be kept small without any leakage light and the width W1 of the double sided adhesive film 150 can be kept small without reducing the adhesive force, the border formed from the first board 1151 and the double sided adhesive film 150 can be narrowed.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
a backlight module, including:
a bottom frame;
a light guide, disposed above the bottom frame;
an optical film structure, disposed above the light guide; and
a top frame, covering a periphery of the optical film structure and covering a lateral side of the bottom frame, wherein the top frame includes:
a first board; and
a second board connected to the first board and covering a lateral surface of the light guide; and
a panel, disposed above the top frame, wherein the first board is disposed between the optical film structure and the panel.

2. The display device according to claim 1, wherein the first board and the second board are substantially perpendicular to each other.

3. The display device according to claim 1, further comprising:
a double sided adhesive film, disposed on the first board.

4. The display device according to claim 3, wherein a width of the double sided adhesive film is substantially equal to or larger than that of the first board or larger than that of the first board.

5. The display device according to claim 1, wherein a thickness of the first board is substantially equal to that of the second board.

6. The display device according to claim 1, wherein the bottom frame includes:
a third board, used for carrying the light guide; and
a fourth board, connected to the third board and covering the lateral surface of the light guide.

7. The display device according to claim 6, wherein the fourth board is disposed between the lateral surface of the light guide and the second board.

8. The display device according to claim 1, wherein the top frame and the bottom frame form a receiving space, the light guide and the optical film structure are disposed inside the receiving space, and the panel is disposed outside the receiving space.

9. The display device according to claim 1, wherein a material of the top frame is metal or plastic.

10. A backlight module, comprising:
a bottom frame;
a light guide, disposed above the bottom frame;
an optical film structure, disposed above the light guide; and
a top frame, covering a periphery of the optical film structure and covering a lateral side of the bottom frame, wherein the top frame includes:
a first board, disposed on the optical film structure; and
a second board, connected to the first board and covering a lateral surface of the light guide;
wherein the top frame and the bottom frame form a receiving space, the light guide and the optical film structure are disposed inside the receiving space, and a panel is disposed outside the receiving space.

11. The backlight module according to claim 10, wherein the first board and the second board are substantially perpendicular to each other.

12. The backlight module according to claim 10, wherein a thickness of the first board is substantially equal to that of the second board.

13. The backlight module according to claim 10, wherein the bottom frame includes:
a third board, used for carrying the light guide; and
a fourth board, connected to the third board and covering the lateral surface of the light guide.

14. The backlight module according to claim 13, wherein the fourth board is disposed between the lateral surface of the light guide and the second board.

15. The backlight module according to claim 10, wherein a material of the top frame is metal.

* * * * *